United States Patent [19]

Dissaux et al.

[11] Patent Number: 5,013,534
[45] Date of Patent: May 7, 1991

[54] MORPHOLOGICALLY IMPROVED RARE EARTH TRIFLUORIDES

[75] Inventors: Antoine Dissaux, Chagnolet; Jean-Luc Le Loarer, La Rochelle, both of France

[73] Assignee: Rhone-Poulenc Chimie, Courbevoie, France

[21] Appl. No.: 373,453

[22] Filed: Jun. 30, 1989

[30] Foreign Application Priority Data

Jul. 1, 1988 [FR] France ................... 88 08909

[51] Int. Cl.$^5$ ............... C01B 9/08; C01F 17/00
[52] U.S. Cl. ................................ 423/263; 423/489
[58] Field of Search ................... 423/263, 489

[56] References Cited

U.S. PATENT DOCUMENTS 2,952,514  9/1960  Smith ................................ 423/489
3,153,570 10/1964  Domning et al. ................. 423/263

FOREIGN PATENT DOCUMENTS 0156617  2/1985  European Pat. Off. .
3134516  6/1988  Japan ................................ 423/263
 798489  7/1958  United Kingdom ............. 423/263

OTHER PUBLICATIONS

"Preparation and Paramagnetism of the Rare Earth Trifluorides", S. Kern and P. M. Raccah, Journal of Phys. Chemi. Solids, Pergamon Press, 1965, vol. 26, pp. 1625–1628.

*Gmelin Handbuch Der Anorganishen Chemie,* H. Bergmann, "Seltenerdelemente; Sc, Y, La und Lanthanide", Edition 8, System No. 39, Teil 3C, 1976, Springer Verlag, Berlin, pp. 3, 34, 35, 168, 169.

Spedding and Doane, "The Rare Earths", Wiley & Sons, N.Y., 1961, p. 84.

Perry, R. H. ed., "Perry's Chemical Engineers' Handbook", McGraw-Hill, N.Y., 1984, pp. 8-14–8-15 and 8-48.

*Primary Examiner*—Michael L. Lewis
*Assistant Examiner*—Brian M. Bolam
*Attorney, Agent, or Firm*—Burns, Doane, Swecker & Mathis

[57] ABSTRACT

Morphologically improved, aggregated, monodispersed rare earth trifluoride particulates having a controlled and narrow grain size distribution, and a mean diameter of less than 1 μm, are prepared by (i) reacting an aqueous solution of a rare earth salt with a solution of ammonium fluoride, (ii) separating the precipitate thus formed, and (iii) heat treating the separated precipitate.

29 Claims, No Drawings

MORPHOLOGICALLY IMPROVED RARE EARTH TRIFLUORIDES

BACKGROUND OF THE INVENTION

1. Field of the Invention

The present invention relates to rare earth trifluorides having novel morphological characteristics and to a process for the preparation of such rare earth fluorides. This invention more especially relates to rare earth trifluorides having a controlled grain size distribution.

2. Description of the Prior Art

Several methods are known to this art for the preparation of rare earth trifluorides.

Such trifluorides may be prepared by reacting an aqueous solution of hydrofluoric acid with a solution of a rare earth salt, e.g., a rare earth carbonate or oxalate, or by reacting an aqueous solution of sodium fluoride with a solution of a rare earth nitrate.

However, such techniques for the synthesis of the rare earth trifluorides produce a product having a coarse grain size. Even by grinding the product it is not possible to obtain specific particle sizes of less than one micron.

SUMMARY OF THE INVENTION

Accordingly, a major object of the present invention is the provision of very finely divided rare earth trifluoride particulates having a narrow grain size distribution.

Another object of the present invention is the provision of very finely divided rare earth trifluoride particulates having a narrow grain size distribution restricted about the mean diameter thereof.

Yet another object of this invention is the provision of an improved process for the facile preparation of such novel rare earth trifluoride particulates.

Briefly, the present invention features very finely divided rare earth trifluoride particulates having a narrow grain size distribution, comprising aggregates having a mean diameter of less than 1.00 μm, advantageously ranging from 0.10 to 0 50 μm, and the said grain size distribution being monodispersed and limited about the mean diameter thereof.

DETAILED DESCRIPTION OF THE PREFERRED EMBODIMENTS OF THE INVENTION

More particularly according to the present invention, by "mean diameter" is intended a diameter such that 50% of the aggregates have a diameter larger or smaller than the mean diameter.

The rare earth fluoride of the invention has a fine grain size distribution, i.e., the mean diameter of the aggregates is less than 1.00 μm and advantageously ranges from 0.10 μm to 0.50 μm, preferably from 0.15 to 0.30 μm.

While not wishing to be bound to any particular theory, it would appear that the mean diameter of the aggregates is often a function of the nature of the rare earth and in particular of the size of the atoms of the rare earth and/or the solubility of its salts appears to influence the mean diameter of the aggregates.

Thus, for example, the mean diameter of the aggregates of cerium trifluoride ranges from 0.10 to 0.50 μm.

All of the results of the grain size analyses presented herein were determined by the sedimentation technique hereinafter described.

The monodispersed character of the aggregate size distribution is evidenced by the dispersion index, defined by the ratio $(d_{84}-d_{16})/2d_{50}$.

The index advantageously is less than or equal to about 0.8, preferably ranges from 0.3 to 0.6, and more preferably from 0.3 to 0.45.

It is indeed surprising and unexpected that a rare earth trifluoride this fine and monodispersed could be produced.

X-ray diffraction analysis shows that the rare earth fluoride obtained for the rare earths ranging from lanthanum to neodymium is a crystalline material, the crystalline phase being of the hexagonal type, having lattice parameters in the case of cerium trifluoride of: $a=0.711$ nm and $c=0.728$ nm. It is a well crystallized compound. By way of example, in the crystallized fraction the size of the crystallites of the cerium trifluoride obtained after treatment at 400° C. is larger than 50 nm.

The size of the aggregates of the rare earth trifluorides of the invention advantageously ranges from about 0.05 μm to 2.0 μm. In a preferred embodiment of the invention, the grain size fraction larger than 1 μm is less than 10% by weight and the grain size fraction larger than 2 μm is less than 0.5% by weight.

By the expression "rare earths" (RE) are intended the rare earth elements of the Periodic Table designated the lanthanides and having atomic numbers of 57 to 71, inclusive, as well as yttrium which has an atomic number of 39. Furthermore, by the term "ceric rare earths" are intended the lightest elements ranging from lanthanum and extending to samarium by atomic numbers; by the term "yttric rare earths" are intended the heaviest rare earth elements ranging from europium and extending to lutecium and including yttrium.

The trifluorides of cerium, lanthanum, neodymium and dysprosium are the compounds presently most often used.

By scanning and transmission electron microscopy, the aggregates and their constitution of one or several elementary crystallites are determined, with the number of said crystallites most typically being less than 4.

This invention also features a process for the preparation of such trifluorides, comprising reacting an aqueous solution of a salt of the rare earth with a solution of ammonium fluoride, and then separating the precipitate thus formed and subjecting it to a heat treatment.

The salt of the rare earth used in the process of the invention may be any rare earth salt that is soluble under the conditions of the reaction.

It is also possible to use a mixture of rare earth salts.

Exemplary of suitable rare earth salts are the nitrates, chlorides and/or sulfates, whether in solid form or as aqueous solutions thereof.

Preferably, a rare earth nitrate is used.

The rare earth salt is selected such that it will not contain impurities which may be transferred into the final product. Advantageously, a rare earth salt having a degree of purity higher than 99% is used.

The concentration of the solution of the rare earth salt is not a critical parameter according to the invention, and may vary over wide limits; a concentration, expressed as the metallic cation, ranging from 0.1 to 3 moles per liter is preferred.

The fluorination agent, ammonium fluoride, is used in solid form, or, preferably, as an aqueous solution.

Its purity should be high, on the order of 99% or higher.

It is possible to use it in the form of a solution having a concentration of from 1 to 5 moles/liter.

The amount of the ammonium fluoride employed is about 3 moles per mole of the rare earth salt. Amounts less than or more than the stoichiometric amount are also within the scope of the invention.

Preferably, an at least stoichiometric amount, or even a slight excess of ammonium fluoride, is used. Thus, the molar ratio $NH_4F$/rare earth salt may range from 3.0 to 3.6.

The reaction may be carried out at a temperature of from 20° to 90° C. Advantageously, a temperature ranging from 60° to 90° C. permits perfect control over the resulting grain size distribution.

A practical embodiment of the invention entails gradually adding a solution of ammonium fluoride to the solution of the rare earth salt, or vice versa.

The duration of the addition may vary, preferably ranging from 30 min to 2 hours.

The solution of the ammonium fluoride may be gradually added to the solution of the rare earth salt previously heated to the reaction temperature, or vice versa.

The ammonium fluoride solution may also be added cold to the solution of the rare earth salt, or vice versa, and the mixture may then be heated to the selected reaction temperature.

It is possible to complete the precipitation by aging the precipitate. This operation is not compulsory. To effect same, the selected reaction temperature is maintained and the reaction medium agitated. The duration of aging is highly variable. Generally, the duration is less than 2 hours and preferably ranges from 30 min to 1 hour.

The second stage of the process of the invention comprises separating the resulting precipitate. The precipitate formed may be separated by conventional solid/liquid separation methods: settling, filtering, draining, centrifuging, and the like.

In a final stage of the process of the invention, the rare earth trifluoride is recovered.

One embodiment comprises subjecting the precipitate to a washing operation, followed by a drying stage.

The precipitate is washed, preferably with water, to eliminate the excess ammonium fluoride and the ammonium salt formed from the anion originating in the beginning rare earth salt.

The precipitate may then be dried to eliminate the water of impregnation. Drying may be carried out in air or under reduced pressure on the order of $10^{-2}$ at 100 mm mercury (1.33 to $1.33 \times 10^4$ Pa).

The drying temperature may range from ambient (most typically from 15° to 25° C.) to 250° C.

The drying time is a function of temperature; it is not critical and may range from 30 min to 24 hours, but preferably it ranges from 2 hours to 8 hours.

Another embodiment of the invention comprises subjecting the separated precipitate to a heat treatment at a temperature in excess of 250° C. to directly eliminate the impregnation salts of the precipitate.

The operation is carried out at a temperature of from 250° C. to about 700° C., preferably from 400° to 500° C.

The duration of the treatment is not critical, and typically ranges from 30 min to 6 hours.

It is also possible to effect a drying operation as described above, prior to the heat treatment.

In certain cases, in particular when the temperature of the heat treatment is higher than 120° C., it is desirable to carry out an operation of deagglomeration to individualize the rare earth fluoride aggregates.

This operation is preferably carried out in an air jet micronizer, but is it also possible to use a conventional ball or roll grinder. The operation may be very short, if it is carried out continuously in an air jet grinder, corresponding to the time of transport of the product, or it may require 30 min in a conventional grinder.

According to the process of the invention, a rare earth trifluoride having a fine and restricted grain size distribution is produced.

It is surprising and unexpected to observe that it is directly related to the grain size distribution of the precipitate produced in the fluorination stage. Such precipitate also has a fine grain size, in contrast to the precipitate obtained by certain conventional methods, as shown in the comparative Experiments A to C given below.

Because of its controlled morphology, the rare earth trifluoride of the invention is especially well suited for applications in the fields of metallurgy and lubrication.

In order to further illustrate the present invention and the advantages thereof, the following specific examples are given, it being understood that same are intended only as illustrative and in nowise limitative.

In said examples to follow (wherein all parts and percentages are given by weight), the grain size analyses were carried out using a SEDIGRAPH 5000D instrument.

This apparatus measures the rate of sedimentation of particles in suspension and automatically displays the results in a cumulative percentage distribution, as a function of equivalent spherical diameters (based on Stokes' law).

The apparatus determines, via a very fine beam of X-rays, the concentration of particles retained in suspension at different heights of sedimentation, as a function of time. The logarithm of the X-ray intensity is generated electronically and recorded, and then displayed linearly as "cumulative percentages" (as less than) on the Y axis of an XY recorder. To limit the time required for the analysis, the sedimentation cell is continually moving such that the depth of the sedimentation cell is inversely proportional to time. The motion of the cell is synchronized with the X axis of the recorder, such as to indicate directly the equivalent spherical diameter corresponding to the time elapsed at a given depth of sedimentation; the dimension information is displayed on a three decade logarithmic chart.

For each rare earth trifluoride, $d_{50}$, $d_{16}$, $d_{84}$ were determined, which made it possible to calculate the dispersion index defined above.

EXAMPLE 1

Into a double walled, 2 liter reactor, with circulating water thermostated at 80° C., equipped with a system for the introduction of the reagents and agitating means, 1,000 cm$^3$ of an aqueous solution of cerous nitrate having a concentration expressed as $CeO_2$ of 220 g/l, were introduced.

After the solution had reached a temperature of 80° C., under agitation, 1,067 cm$^3$ of an aqueous solution of ammonium fluoride containing 150 g/l $NH_4F$ were introduced, at a flow rate of 533.5 cm$^3$/h.

An agitation of 200 rpm was maintained during the precipitation.

Following precipitation, the pH was adjusted to 4 by means of a 3N aqueous ammonia solution.

The reaction medium was maintained at 80° C., under agitation, for 30 min.

The precipitate was separated on a Büuchner filter and the filter cake was well drained.

360 g of a moist rare earth trifluoride precipitate were produced, containing 70% by weight cerium trifluoride, expressed as dry solids.

It had a mean aggregate diameter of 0.12 μm and less than 0.5% of the aggregates had a diameter larger than 1 μm.

The precipitate was then subjected to a heat treatment at 450° C. for 2 hours.

After cooling, the treated precipitate was subjected to a deagglomeration operation in an air jet micronizer apparatus having a diameter of 100 mm, at a rate of 200 g/h, using an air pressure of 5 bars ($10^5$ Pa).

252 g cerium trifluoride having the following morphological characteristic were collected:

(a) Mean diameter of aggregates: 0.18 μm;
(b) Percentage of aggregates having a mean diameter larger than 1 μm: 4%;
(c) Dispersion index: 0.45.

EXAMPLES 2 to 5

In these examples, the procedure of Example 1 was repeated, except for the temperature, which ranged from 120° to 450° C. In addition, the deagglomeration treatment was omitted.

The results are reported in Table I:

TABLE I

| Example No. | Heat treatment temperature (°C.) | Mean diameter of aggregates | Percentage higher than 1 μm |
|---|---|---|---|
| 2 | 120 | 0.14 | 9 |
| 3 | 200 | 0.19 | 16 |
| 4 | 300 | 0.19 | 29 |
| 5 | 400 | 0.30 | 43 |

It will be appreciated that the cerium trifluoride had a mean aggregate diameter that was larger and a higher percentage of aggregates with diameters larger than 1 μm, if the temperature of the treatment was increased.

EXAMPLE 6

The procedure of Example 5 was repeated, except that the recovered precipitate was subjected, after the heat treatment, to a deagglomeration operation in an air jet micronizer apparatus.

A cerium trifluoride having the following morphological characteristics was recovered:

(a) Mean diameter of aggregates: 0.28 μm;
(b) Percentage of aggregates having a mean diameter larger than 1 μm: <0.5%;
(c) Dispersion index: 0.30.

EXAMPLES 7 to 10

The procedure of Example 1 was repeated, except that the aqueous solution of the rare earth nitrates comprised, in addition to cerium, the nitrates of dysprosium, lanthanum, neodymium.

The results obtained are reported in the following Table II:

TABLE II

| | | Characteristics of the RE trifluorides | | |
|---|---|---|---|---|
| Example | RE nitrate | ⌀ 50 | % > 1 μm | Dispersion index |
| 7 | Ce(NO$_3$)$_3$ | 0.25 | <5% | 0.4 |
| 8 | Dy(NO$_3$)$_3$ | 0.35 | 7.8% | 0.80 |
| 9 | La(NO$_3$)$_3$ | 0.16 | 4% | 0.55 |
| 10 | Nd(NO$_3$)$_3$ | 0.21 | 0% | 0.41 |

Three comparative experiments will now be presented, which evidenced that the conventional methods of the preparation of cerium trifluoride do not produce a product having a fine and restricted grain size distribution.

EXPERIMENTS A to C:

EXPERIMENT A

Into a 2 liter polytetrafluoroethylene beaker, 285 cm$^3$ of a 40% by weight aqueous solution of hydrofluoric acid were charged, together with 193 cm$^3$ deionized water.

Under agitation and over 30 min, 1,120 cm$^3$ of an aqueous suspension of cerium carbonate, containing 580 g cerium carbonate, were introduced, the suspension having a concentration, expressed as CeO$_2$, of 55.2%.

The reaction medium was maintained under agitation for 30 min.

The precipitate formed was separated on a Büchner filter and the filter cake was drained well.

A precipitate was obtained, the aggregates of which had a mean diameter of 0.27 μm and 35% of the aggregates of which had a diameter larger than 1 μm.

The precipitate was then subjected to a heat treatment at 450° C. for 2 hours.

After cooling, the precipitate was subjected to aggregate deagglomeration.

366 g of cerium trifluoride having the following morphological characteristics were obtained:

(a) Mean aggregate diameter: 0.74 μm;
(b) Percentage of aggregates having a mean diameter larger than 1 μm: 40%;
(c) Dispersion index: 1.3.

EXPERIMENT B

Into a reactor such as that described in Example 1, 455 cm$^3$ of an aqueous solution of sodium fluoride containing 257.5 g NaF were introduced.

When the solution reached 70° C., 633 cm$^3$ of an aqueous solution of cerous nitrate were introduced, under agitation, with the solution having a concentration, expressed in CeO$_2$, of 505 g/l.

The reaction medium was maintained under agitation for 30 min.

The precipitate formed was separated on a Büchner filter and the filter cake was drained well.

A precipitate of aggregates having a mean diameter of 1.1 μm was produced; 53% of the aggregates had a diameter larger than 1 μm.

The precipitate was then subjected to a heat treatment at 450° C. for 2 hours.

After cooling, it was subjected to an aggregate deagglomeration operation.

366 g of cerium trifluoride were obtained having the following characteristics:

(a) Mean aggregate diameter: 1.1 μm;
(b) Percentage of aggregates having a mean diameter greater than 1 μm: 52%;
(c) Dispersion index: 1.05.

EXPERIMENT C

Into a 2 liter polytetrafluoroethylene beaker, 285 cm³ of a 40% aqueous solution of hydrofluoric acid were introduced, together with 193 cm³ deionized water.

Under agitation and over 30 min, 1,120 cm³ of an aqueous solution of cerium oxalate were introduced, containing 576 g cerium oxalate and having a concentration, expressed as $CeO_2$, of 55.5%.

The reaction medium was maintained under agitation for 30 min.

The precipitate was separated on a Büchner filter and the filter cake was drained well.

A precipitate of aggregates having a mean diameter of 0.15 μm was produced; 28% of the aggregates had a diameter greater than 1 μm.

The precipitate was then subjected to a heat treatment at 450° C., for 2 hours.

After cooling, it was subjected to an aggregate deagglomeration operation.

366 g of cerium trifluoride having the following morphological characteristics were obtained:

(a) Mean aggregate diameter: 1.3 μm;
(b) Percentage of aggregates having a mean diameter greater than 1 μm: 55%;
(c) Dispersion index: 1.2.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Aggregated, monodispersed rare earth trifluoride particulates, said aggregates having a mean diameter ranging from 0.10 μm to 0.50 μm.

2. The aggregates as defined by claim 1, having a mean diameter ranging from 0.15 μm to 0.50 μm.

3. The aggregates as defined by claim 1, having a size ranging from 0.05 μm to 2.0 μm.

4. The aggregates as defined by claim 3, wherein the grain size fraction larger than 1 μm is less than 10% by weight.

5. The aggregates as defined by claim 4, wherein the grain size fraction larger than 2 μm is less than 0.5% by weight.

6. The aggregates as defined by claim 1, having a dispersion index no greater than 0.8.

7. The aggregates as defined by claim 6, having a dispersion index ranging from 0.3 to 0.6.

8. The aggregates as defined by claim 7, having a dispersion index ranging from 0.3 to 0.45.

9. The aggregates as defined by claim 1, comprising cerium, lanthanum, neodymium or dysprosium trifluoride.

10. The aggregates as defined by claim 9, comprising cerium trifluoride.

11. A process for the preparation of aggregated, monodispersed rare earth trifluoride particulates having a mean diameter less than 1 μm, comprising (i) reacting an aqueous solution of a rare earth (III) salt with a solution of ammonium fluoride, (ii) separating the precipitate thus formed, and (iii) heat treating said separated precipitate.

12. The process as defined by claim 11, said rare earth salt comprising a nitrate, chloride and/or sulfate.

13. The process as defined by claim 12, said rare earth salt comprising a nitrate.

14. The process as defined by claim 11, wherein the concentration of the solution of the rare earth salt, expressed as the metallic cation, ranges from 0.1 to 3 moles per liter.

15. The process as defined by claim 14, wherein the concentration of the ammonium fluoride solution ranges from 1 to 5 moles/liter.

16. The process as defined by claim 11, wherein the molar ratio $NH_4F$/rare earth salt ranges from 3.0 to 3.6.

17. The process as defined by claim 11, carried out at a reaction temperature ranging from 20° to 90° C.

18. The process as defined by claim 17, carried out at a reaction temperature ranging from 60° to 80° C.

19. The process as defined by claim 11, comprising adding the ammonium fluoride solution to the solution of the rare earth salt heated to the reaction temperature.

20. The process as defined by claim 11, comprising adding the ammonium fluoride solution to the solution of the rare earth salt, and heating the mixture to the reaction temperature.

21. The process as defined by claim 19, wherein the duration of the addition to the ammonium fluoride solution ranges from 30 min to 2 hours.

22. The process as defined by claim 11, comprising aging the precipitate thus formed.

23. The process as defined by claim 22, said aging comprising maintaining the reaction medium at the reaction temperature, under agitation.

24. The process as defined by claim 11, comprising washing the separated precipitate with water and then drying same.

25. The process as defined by claim 24, comprising drying at a temperature ranging from ambient to 250° C.

26. The process as defined by claim 11, comprising heat treating the separated precipitate at a temperature ranging from 250° C. to 700° C.

27. The process as defined by claim 26, comprising heat treating the separated precipitate at a temperature ranging from 400° C. to 500° C.

28. The process as defined by claim 11, further comprising fractionally deagglomerating the aggregates thus produced.

29. The process as defined by claim 28, comprising air jet micronizing the aggregates thus produced.

* * * * *